United States Patent
Huang et al.

(10) Patent No.: US 6,759,358 B2
(45) Date of Patent: Jul. 6, 2004

(54) METHOD FOR WASHCOATING A CATALYTIC MATERIAL ONTO A MONOLITHIC STRUCTURE

(75) Inventors: Yinyan Huang, Framingham, MA (US); Amiram Bar-Ilan, Brookline, MA (US)

(73) Assignee: Sud-Chemie Inc., Louisville, KY (US)

( * ) Notice: Subject to any disclaimer, the term of this patent is extended or adjusted under 35 U.S.C. 154(b) by 289 days.

(21) Appl. No.: 09/933,916

(22) Filed: Aug. 21, 2001

(65) Prior Publication Data

US 2003/0040425 A1 Feb. 27, 2003

(51) Int. Cl.[7] .................................. B01J 29/06
(52) U.S. Cl. ........................ 502/64; 502/71; 502/77
(58) Field of Search ........................ 502/64, 71, 77, 502/439, 527.19

(56) References Cited

U.S. PATENT DOCUMENTS

| | | | |
|---|---|---|---|
| 4,791,083 A | * 12/1988 | Pellet et al. | ............ 502/64 |
| 4,814,316 A | * 3/1989 | Pellet et al. | ............ 502/214 |
| 4,859,314 A | * 8/1989 | Pellet et al. | ............ 208/114 |
| 4,861,739 A | * 8/1989 | Pellet et al. | ............ 502/64 |
| 4,900,712 A | 2/1990 | Bar-Ilan et al. | |
| 4,961,917 A | * 10/1990 | Byrne | ............ 423/239.2 |
| 5,206,202 A | 4/1993 | Lachman et al. | |
| 5,354,720 A | 10/1994 | Leyrer et al. | |
| 5,443,803 A | 8/1995 | Mizuno et al. | |
| 5,707,148 A | 1/1998 | Visser et al. | |
| 5,776,423 A | 7/1998 | Feeley et al. | |
| 5,813,764 A | 9/1998 | Visser et al. | |
| 5,869,419 A | * 2/1999 | Obayashi et al. | ............ 502/305 |
| 5,968,861 A | * 10/1999 | Feeley et al. | ............ 502/74 |
| 5,972,821 A | * 10/1999 | Nojima et al. | ............ 502/66 |
| 6,004,896 A | 12/1999 | Addiego | |
| 6,074,973 A | * 6/2000 | Lampert et al. | ............ 502/60 |
| 6,080,377 A | 6/2000 | Deeba et al. | |
| 6,093,378 A | 7/2000 | Deeba et al. | |
| 6,126,912 A | * 10/2000 | Bourges et al. | ............ 423/239.1 |
| 6,150,291 A | 11/2000 | Deeba et al. | |
| 6,534,022 B1 | * 3/2003 | Carlborg et al. | ............ 422/180 |
| 6,551,564 B1 | * 4/2003 | Becue et al. | ............ 423/239.1 |
| 6,569,394 B2 | * 5/2003 | Fischer et al. | ............ 423/239.2 |

FOREIGN PATENT DOCUMENTS

| JP | 01135540 | * 5/1989 |
|---|---|---|
| JP | 1135541 | 5/1989 |

* cited by examiner

*Primary Examiner*—Stanley S. Silverman
*Assistant Examiner*—Colleen P. Cooke
(74) *Attorney, Agent, or Firm*—Scott R. Cox; Joan L. Simunic

(57) ABSTRACT

A method of producing a washcoated monolith catalyst utilizing a dual sol binder system, wherein the binder system is a blend of an alumina sol and a silica sol and wherein the ratio of the alumina to the silica in the dual sol binder system is from about 6:1 to about 1:3.

20 Claims, No Drawings

METHOD FOR WASHCOATING A CATALYTIC MATERIAL ONTO A MONOLITHIC STRUCTURE

CROSS REFERENCE TO RELATED APPLICATIONS

NONE

BACKGROUND OF INVENTION

1. Field of Invention

This invention relates to a method for washcoating a catalytic material onto a monolithic structure. More particularly, it relates to a monolithic catalyst produced by washcoating a monolith structure with a catalytic washcoat composition, wherein the catalytic washcoat composition is formed by blending a zeolitic material with a binder system, wherein the binder system is a dual sol binder, preferably a silica sol and alumina sol binder system.

2. Description of Related Art

Monolithic catalyst products having a cellular or honeycomb structure have increasingly been utilized in stationary emission control situations and for chemical synthesis and processing facilities. Monolithic catalyst products are also utilized in the automotive industry and for NOx conversion in feed streams.

Catalyst products of this type are generally fabricated by preparing a substantially homogeneous cellular ceramic material and securing a catalyst material to that ceramic material. The catalyst product can also be formed by impregnating a monolith structure with a catalyst material and then heat treating the coated monolith to produce the final product.

Conventional washcoating techniques for production of catalytic monolith products generally comprise preparing a coating formed from a high surface area oxide blended with one or more catalysts and dipping the monolith structure into that coating blend. In one utilization for automotive converters the catalyst comprises one or more noble metals, such as platinum, palladium and rhodium. These noble metals are blended with high surface area metal oxides, such as alumina or ceria. These washcoats are then coated upon monolithic support structures, such as ceramic honeycomb supports. A method of coating a preformed high surface area washcoat onto a monolithic support is disclosed in U.S. Pat. No. 4,900,712.

Numerous references disclose the use of catalytically active washcoat compositions comprising an alumina binder and catalytically active noble metals for oxidation of hydrocarbons and/or reduction of nitrogen oxides for field abatement, automotive exhaust control and the like, including, for example, U.S. Pat. Nos. 6,150,291, 6,093,378, 6,080,377, 5,773,423 and 5,354,720.

In one specific example of the formation of a catalytic monolithic product for the selective catalytic reduction of NOx, a washcoat is coated onto a honeycomb substrate, such as a cordierite honeycomb substrate. In U.S. Pat. No. 5,206,202 a honeycomb substrate is coated with a catalytic iron/vanadium mixture blended in an alumina or titania binder.

In another example, U.S. Pat. No. 5,776,423 discloses a process for the preparation of a metallic zeolite catalyst for NOx abatement. Example 1 of the '423 patent discloses a process for the formation of a copper and iron ZSM-5 zeolite product. The binder (Nalco™ 1056) for the metallic zeolite catalyst product is comprised of a 4 weight percent alumina coating on a 26 weight percent silica sol. This example discloses the use of only one type of sol for the washcoat, i.e., a silica sol. The alumina utilized in the example is chemically bonded to the silica sol by means of Al—O—Si bonds. See also U.S. Pat. Nos. 6,150,291 and 5,354,720.

U.S. Pat. No. 6,093,378 discloses a catalyst composition for treating diesel exhausts which comprises blending a first zeolite component in the presence of a precious metal, a second zeolite component and a precious metal and a non-catalytic, pore-containing zeolite. The binder for the active materials as disclosed in Examples 2 and 4 is apparently the same Nalco™ material that was disclosed in U.S. Pat. No. 5,776,423. See also U.S. Pat. No. 5,443,803.

Other catalysts for purifying exhaust gases are disclosed by U.S. Pat. Nos. 5,443,803 and 5,354,720. Each of these patents discloses the use of a silica sol used as a binder for coating an active metal onto a monolithic structure.

U.S. Pat. No. 6,004,896 discloses a hydrocarbon absorber and a method of making same. A ZSM-5 zeolite is treated with phosphoric acid and then blended into a slurry for washcoating onto a monolithic structure. The preferred binder for the slurry is alumina, although the composition of the binder may also include silica and/or zirconia or their precursors.

JP 1135541 discloses an exhaust gas cleaning catalyst comprising a zeolite which has been ion exchanged with one or more metals selected from the group consisting of Pt, Pd, Rh, Ir and Ru. The ion exchanged zeolite is blended with a binder. The particularly preferred binder, as shown in Working Examples 1–5, is a mixture of a silica sol and an alumina sol obtained by mixing the two components at a Si/Al elemental ratio of 30. With a silicon to aluminum elemental ratio of 30:1, the silica:alumina ratio of the binder is approximately 9:1. The blended product is adjusted to a pH of about 3 to 6 by the addition of an aluminum nitrate solution. Binders with such high silica:alumina ratios have a reduced ability to adhere to monolithic structures and exhibit high cell clogging during application. In addition, while the aluminum nitrate may have been added to the blend for pH adjustment, it is believed that it was also added to enhance the ability of the zeolite to bind to the substrate. The addition of such pH adjusting materials may adversely affect the ability of the blended product to bind to the substrate. The teaching of JP 1135541 is that zeolite-based precious metal catalysts have a superior performance to catalysts formed where alumina is the support for the precious metal. Any advantage from the use of a particular binder blend was not discussed and apparently not recognized.

U.S. Pat. No. 5,813,764 discloses a catalytic microcalorimeter sensor for monitoring exhaust gas conversions. The sensor disclosed is a washcoat obtained by mixing silica sol and alumina sol. The washcoat is used as the catalytic material itself and is not used as a binder material. The '764 patent also discloses the use of catalytically active metal particles. See the related patent, U.S. Pat. No. 5,707,148.

Conventional zeolitic materials washcoated onto a monolithic substrate, such as a honeycomb monolith, conventionally utilize silica sol or alumina sol separately as a binder. When either silica sol or alumina sol is used separately as a binder, the resulting catalytic washcoat material generally has low viscosity, in the range of 1–50 cps and normally in the range of 10–20 cps. Silica sol is the preferred binder for washcoating zeolite materials onto a monolithic substrate as silica sol is miscible with zeolite. In contrast, when alumina sol is used as a binder, it tends to separate from the zeolite materials. In addition, when silica sol is used as a binder, zeolite/binder mixtures dehydrate very quickly when exposed to air, which can lead to cell clog during washcoating as the washcoat slurry dries before it is removed from the cell during processing. Further, when a silica sol binder is utilized, the pick up of the catalytic washcoat material onto the monolithic structure decreases during consecutive dipping steps. In addition, the catalytic washcoat material often has weak adhesion to the monolithic substrate when a silica sol is used as the binder. Thus, when a single sol binder is utilized, the monolithic structure may lose some of the catalytic washcoat material during utilization from flaking or when it is exposed to a liquid. When alumina sol is used a binder, the resulting washcoat slurry is not stable and the binder tends to separate from the catalytic material.

Accordingly, it is an object of this invention to disclose a process for the coating of a monolithic structure with a catalytic washcoat composition which produces a monolithic catalyst which is stable, reduces clogging, has an increased pick up in consecutive dipping steps, and has an enhanced adhesion of the catalytic washcoat composition to the monolithic structure.

It is a further object of the invention to disclose a catalytic washcoat composition for coating a monolithic structure wherein the binder for the catalytic material is formed from a dual sol mixture.

It is a still further object of the invention to disclose a catalytic washcoat material for coating a monolithic structure, wherein the binder is a dual sol binder and wherein the dual sol binder is a combination of silica sol and alumina sol.

It is a still further object of the invention to disclose a catalytic washcoat material for coating a monolithic structure wherein the binder is a combination of a silica sol and an alumina sol, wherein the ratio of the silica to the alumina in the binder system is 6:1 or less.

It is a still further object of the invention to disclose a catalytic washcoat material for coating a monolithic structure with a zeolitic material wherein the binder system is a combination of a silica sol and an alumina sol which does not require the addition of additive materials to enhance the adhesion of the catalytic washcoat material to the monolithic structure.

It is a still further object of the invention to disclose a monolithic catalyst for selective catalytic reduction utilizing a monolithic structure coated with a catalytic washcoat material comprising a metal exchange zeolite and a dual sol binder system, wherein the dual sol binder system is a combination of a silica sol and an alumina sol.

These and other aspects of the invention are obtained from various designs of the catalyst material and the binder system of the present invention, the process of their manufacture and use and by the processes disclosed herein.

SUMMARY OF THE INVENTION

The present invention is a catalytic washcoat composition for coating a monolithic structure comprising a binder system and a catalytic material, wherein the binder system is a dual sol binder system. Preferably, the dual sol binder system is a blend of a silica sol and an alumina sol, wherein the ratio of the silica to the alumina in the binder system is from about 1:3 to 6:1, preferably from about 3:1 to about 6:1.

The present invention also relates to a process for production of a washcoated monolithic catalyst comprising preparing a monolithic structure, preparing a catalytic washcoat composition by mixing a binder system with a catalytic material, wherein the binder system comprises a dual sol blend, wherein the dual sol blend comprises a mixture of a silica sol and an alumina sol, and wherein the ratio of the silica to the alumina in the dual sol blend is from 1:3 to 6:1, and coating the monolith structure with the catalytic washcoat composition.

In a preferred embodiment, the process is performed without the addition of additive materials to enhance the adhesion of the catalytic washcoat composition to the monolithic structure.

The invention also encompasses a process for the reduction of NOx in a feed stream comprising passing the feed stream over a monolithic catalyst, wherein the monolithic catalyst comprises a monolithic structure coated with a catalytic washcoat composition wherein the catalytic washcoat composition comprises a binder system and a catalytic material, wherein the binder system comprises a dual sol binder, wherein the dual sol binder comprises a mixture of a silica sol and an alumina sol, and wherein the ratio of the silica to the alumina in the mixture is from about 1:3 to 6:1, preferably from about 3:1 to about 6:1.

DETAILED DESCRIPTION OF THE INVENTION

The present invention pertains to methods and materials for producing improved monolithic catalysts, particularly for selective catalytic removal, decomposition or reduction of nitrogen oxides. The monolithic catalyst is produced by washcoating a catalytic washcoat composition onto a monolithic structure. The catalytic washcoat composition is produced by blending a catalytic material with a binder system.

The catalytic material that is utilized for this catalytic washcoat composition is preferably a zeolite. Any suitable zeolite may be used in accordance with the present invention. For example, zeolites such as beta zeolite, Y-zeolite, ZSM-5, morganite and ferrierite are all suitable for the preparation of the catalytic material in accordance with the present invention. Preferably, the zeolite is a ZSM-5 zeolite although any conventional zeolite useful for the reduction of NOx in a feed stream is satisfactory.

Preferably, the zeolite is ion exchanged to incorporate a metal into the zeolite. The preferred metals may be any of the recognized catalytically active metals that are utilized in the catalyst industry to form metal-exchanged zeolites. When the zeolite catalyst material is utilized for reduction of nitrogen oxides, the preferred metals include conventional NOx reduction metals such as platinum, palladium and other noble metals, cerium, copper, cobalt and iron, preferably, copper.

To form the metal-exchanged zeolite, the zeolite is blended into a solution containing soluble precursors of the catalytically active metal. The pH of the solution may be adjusted, for example, by the addition of ammonium hydroxide to induce precipitation of the catalytically active cations onto or within the zeolitic structure. Thus, for example, in a preferred embodiment ZSM-5 zeolite is immersed in a solution containing copper nitrate for a time sufficient to allow incorporation of the catalytically active copper cations into the zeolite structure by ion exchange and then ammonium hydroxide is added to incorporate unexchanged copper ions in the solution into the zeolite structure by precipitation. The metal-substituted zeolite may then be washed, dried and calcined. When copper is used as the metal cation, the copper content of the catalytic material by weight preferably comprises from about 0.1 to about 15 percent by weight and more preferably from about 1 to about 10 percent by weight of the zeolite material.

Generally, ion exchange of the catalytic metal cation into or on the zeolite may be carried out at room temperature or at a temperature up to about 80° C. over a period of about 1 to 24 hours at a pH of about 7. The resulting catalytic zeolite material is preferably dried at about 100 to 120° overnight and calcined at about 550° C.

To form the catalytic washcoat composition, the zeolite, preferably a copper exchanged, ZSM-5 zeolite, is blended with a binder system. Conventional binders can be utilized to form this binder system, such as alumina, silica, zirconia, ceria or titania or their precursors, such as colloidal aluminas, such as boehmite and colloidal forms of alumina, silica, ceria, zirconia or titania. However, it has been unexpectedly discovered that a superior catalytic washcoat composition can be produced when the cation-exchanged zeolite is mixed with a binder system, wherein the binder system is comprised of two or more different sols. In a preferred embodiment, a dual sol binder system is utilized which is comprised of a silica sol and alumina sol, wherein the ratio of the silica to the alumina in the binder system is from about 6:1 to about 1:3 and preferably from about 6:1 to about 3:1. It has been surprisingly discovered that when dual sol binder systems are prepared utilizing the proper ratio of the components, the monolithic catalysts that are produced have enhanced performance characteristics over monolithic catalysts prepared using a single sol binder system.

The silica to alumina ratio in the binder system apparently plays a significant role in the performance of the monolithic catalyst. With silica to alumina ratios of 8 or higher, such as is disclosed in JP 1135541, the catalytic washcoat composition has a low viscosity of less than 40 cps and a low gel forming capability. Further, the performance of a monolithic catalyst formed using a silica sol/alumina sol dual sol binder system with a ratio of silica:alumina greater than 8:1 is substantially reduced over the performance of a monolithic catalyst manufactured using the dual sol binder system of the invention. When the ratio of the silica to the alumina in the dual sol binder system is from about 6:1 to about 1:3, the gel forming capability of the binder system increases substantially, usually in less than 30 minutes. In contrast, no gel is formed when a blend of silica sol and alumina sol is prepared where the ratio of the silica to the alumina in the binder system is about 8:1 or greater as disclosed in JP 1135541. In addition, when the silica to alumina ratio in the binder system is within the range set forth above, there is less cell clogging of the monolithic structure during the washcoating process. In contrast, when the silica to alumina ratio is higher than about 6:1 in the binder system, the viscosity of the binder system is closer to that of a binder system containing only silica sol, resulting in cell clogging during the washcoating process. A conventional silica sol or alumina sol binder has a viscosity in the range of about 1–50 cps, generally 10–20 cps, whereas the viscosity of the dual binder system of the invention, which is formed from a blend of an alumina sol and silica sol with a silica to alumina ratio of between 1:3 and 6:1, is at least about 100 cps and preferably above 200 cps.

Further, when the ratio of the silica to the alumina in the binder system is from about 6:1 to about 3:1, the adhesion of the catalytic washcoat composition to the monolithic structure is enhanced, permitting the final coated monolithic structure to be washed with water without any substantial loss of the catalytic material. The monolithic catalyst of the invention also does not flake during commercial utilization. In contrast, when the ratio of the silica sol to the alumina sol in the binder system is greater than about 6:1, there is an enhanced tendency to reduced adhesion of the catalytic washcoat composition to the monolithic structure.

In addition, when the ratio of the silica to the alumina in the binder system is from about 6:1 to about 3:1, no other additives need be added to the binder system to achieve a well adhered catalytic washcoat composition. In contrast, in JP 1135541 aluminum nitrate was added to the binder system to adjust the pH of the binder system and to enhance the ability of the alumina sol/silica sol blend to act as a binder for the catalytic material. No such aluminum nitrate addition is necessary for the binder system of the invention. It is a significant disadvantage to require the addition of an acid or a salt to a mixture containing a metal-exchanged zeolite and a binder system, as such addition can result in cation leaching from the zeolite inner surface. For example, if acidic acid is used to adjust the pH of a copper-exchanged zeolite and to enhance its adhesion, copper ions are often leached out of the zeolite inner surface, resulting in a lower catalytic activity than occurs when no acid is added to the binder system.

It has also been discovered that a blend of a silica sol and an alumina sol in the binder system at the preferred ratio may be especially useful because of the opposing electrical charge of the ions. The positively charged alumina sol particles mix with the negatively charged silica sol particles to form a gel. It is believed that this interaction enhances the quality of the binder system to bind the catalytic washcoat composition to the monolithic structure.

Other types of dual sol binders may also be useful, including silica sol mixed with ceria sol or with zirconia sol.

In the process of the invention the metal exchanged zeolite, preferably a copper exchanged ZSM-5 zeolite, and the binder system are blended together in a water solution for a significant period of time, preferably one hour or more, until the mixture has reached a viscosity of at least about 100 cps, preferably at least about 200 cps.

The catalytic material/binder system forms the catalytic washcoat composition which is then coated onto the monolithic structure. Preferably, the monolithic structure is a honeycomb material, wherein the honeycomb material is a multi-cellular, thin walled structure, such as a 400 cpsi ceramic honeycomb material manufactured by Corning. The honeycomb material is dipped into the catalytic washcoat composition using a conventional dipping procedure and is then subjected to processes which remove any excess catalytic washcoat composition, such as by air-knifing. The honeycomb material may be dipped two (2) or more times to achieve the proper catalyst material loading. Using the dual sol binder system of the invention, it has been surprisingly discovered that an adequate catalytic material coating can be achieved with only two (2) dippings, whereas conventional binder systems require at least three (3) or more dippings.

Following the catalytic washcoat composition loading, the coated monolithic structure is dried and calcined at a temperature of about 500° C. for a sufficient time, generally from about 30 minutes to 2 hours, to fix the composition onto the monolithic structure.

The monolithic catalyst according to the invention is particularly useful for the conversion of various exhaust gases, such as carbon monoxide and particularly for NOx. Specifically, the monolithic catalyst is particularly useful for the abatement of NOx in exhaust gas streams, such as when used as an exhaust gas cleaning catalyst for internal combustion engines and, more particularly, as a catalyst capable of efficiently removing NOx from an oxygen-rich environment with a lean air-fuel ratios.

EXAMPLES

A catalytic washcoat composition for washcoating on a monolithic structure was prepared by adding 50 liters of distilled water into a large vessel. Under stirring 22 liters of a silica sol (SnowTexO), 3.5 liters of alumina sol (Nyacol Dispal) and 50 kilograms of copper-ZSM-5 powder, provided by Süd-Chemie Nissan Chemicals, were added to the vessel. The silica:alumina ratio of the mixture was 6:1. The mixture was stirred for about 1 hour until it reached a viscosity of about 200 cps. The mixture was then diluted to a specific gravity of 1.25. A Corning 400 cpsi ceramic honeycomb material of 5.66 inch diameter and 6 inch length was then dipped into the catalytic washcoat composition. The honeycomb material was subjected to air-knifing to remove extra catalytic washcoat composition to form clean cells. The honeycomb material was dipped twice to achieve a catalytic washcoat composition loading of about 3000–3500 g/ft$^3$. The monolithic catalyst was then dried and calcined at 500° C. for 1 hour.

The honeycomb monolithic catalyst was tested in a high gas flow reactor by injecting diesel fuel as a reducing agent. The amount of diesel fuel is represented as total hydrocarbons (THC). The space velocity is 60,000 h$^{-1}$ with an average 500 ppm of NOx at the inlet. The activity of the monolithic catalyst (NOx conversion) is tabled as follows:

| THC (ppm) | 500 | 1000 | 2000 | 3000 |
|---|---|---|---|---|
| THC/NOx ratio | 1 | 2 | 4 | 6 |
| 200° C. | 2.9 | 2.9 | 2.5 | 1.7 |
| 250° C. | 2.1 | 6.7 | 9.2 | 8.8 |
| 300° C. | 7.5 | 10.0 | 12.5 | 13.3 |
| 350° C. | 9.2 | 14.6 | 23.8 | 33.3 |
| 400° C. | 10.8 | 14.6 | 25.8 | 33.5 |
| 450° C. | 20.0 | 23.3 | 33.3 | 38.3 |

NOx reduction ratio increased with increasing the THX/NOx ratio and temperature up to 400° C. In diesel engine applications, a catalyst lifetime of 800 hours with 30 percent NOx conversion was obtained.

It is clear from this example that the monolithic catalyst had high performance and substantially reduced the amount of NOx that was present in the feed stream.

What is claimed is:

1. A washcoating process for production of a monolithic catalyst comprising
   preparing a monolithic structure,
   preparing a catalytic washcoat composition comprising a mixture of a binder system with a catalytic material, wherein the binder system comprises a dual sol binder,
   coating the monolithic structure with the catalytic washcoat composition, and
   drying the coated monolithic structure,
   wherein the dual sol binder comprises a silica sol and an alumina sol and wherein the ratio of the silica to the alumina in the dual sol binder is from about 6:1 to about 1:3.

2. The process of claim 1 wherein the ratio of the silica to the alumina is from about 6:1 to about 3:1.

3. The process of claim 1 wherein the pH of the dual sol binder is from about 1 to about 10.

4. The process of claim 1 wherein the pH of the dual sol binder is from about 3 to about 6.

5. The process of claim 1 wherein the catalytic material comprises a zeolite.

6. The process of claim 1 wherein the catalytic material comprises a metal-exchanged zeolite.

7. The process of claim 1 wherein the catalytic material comprises a copper-exchanged zeolite.

8. The process of claim 1 wherein the catalytic material comprises a copper-exchanged ZSM-5 zeolite.

9. A washcoating process for production of a monolithic catalyst comprising
   preparing a monolithic structure,
   preparing a catalytic washcoat composition comprising a mixture of a binder system with a catalytic material, wherein the binder system comprises a dual sol binder,
   coating the monolithic structure with the catalytic washcoat composition without adding any additional additives to the solution to enhance adhesion of the catalytic washcoat composition to the monolithic structure, and
   drying the coated monolithic structure,
   wherein the dual sol binder comprises a silica sol and an alumina sol and wherein the ratio of the silica to the alumina in the dual sol binder is from about 6:1 to about 1:3.

10. The process of claim 9 wherein the ratio of the silica to the alumina is from about 6:1 to about 3:1.

11. The process of claim 9 wherein the catalytic material comprises a zeolite.

12. The process of claim 9 wherein the catalytic material comprises a metal-exchanged zeolite.

13. The process of claim 9 wherein the catalytic material comprises a copper-exchanged zeolite.

14. A process for the reduction of NOx in a feed stream comprising passing the feed stream over the monolithic catalyst produced by the process of claim 1.

15. A process for the reduction of NOx in a feed stream comprising passing the feed stream over the it monolithic catalyst produced by the process of claim 9.

16. A catalytic washcoat composition for coating monolith structure comprising
   a binder system and a catalytic material, wherein the binder system comprises a dual sol binder, wherein the dual sol binder comprises a mixture of a silica sol and an alumina sol and wherein the ratio of the silica to the alumina in the dual sol binder is from about 6:1 to about 1:3.

17. The composition of claim 16 wherein the ratio of the silica to the alumina is from about 6:1 to about 1:3.

18. The composition of claim 16 wherein the catalytic material comprises a metal exchanged zeolite.

19. The composition of claim 16 wherein the catalytic material comprises a copper-exchanged zeolite.

20. The composition of claim 16 wherein the catalytic material comprises a copper-exchanged ZSM-5 zeolite.

* * * * *